UNITED STATES PATENT OFFICE.

LUDWIG PREUSSNER, OF BERLIN, GERMANY.

PROCESS OF PRODUCING MARBLE-LIKE OR ENAMEL-LIKE OBJECTS.

SPECIFICATION forming part of Letters Patent No. 424,352, dated March 25, 1890.

Application filed September 19, 1887. Serial No. 250,116. (No specimens. Patented in England March 29, 1887, No. 4,689.

*To all whom it may concern:*

Be it known that I, LUDWIG PREUSSNER, a subject of the King of Prussia and German Emperor, residing at the city of Berlin, in the Kingdom of Prussia, German Empire, have invented a certain new and useful Improved Process for the Production of Marble-Like or Enamel-Like Objects, (for which I have obtained Letters Patent in Great Britain, March 29, 1887, No. 4,689;) and I do hereby declare that the following is a full, clear, and exact description of the invention, which will enable others skilled in the art to which it appertains to make and use the same.

This invention has reference to an improved process for the production of polished marble, stone, or enamel-like objects; and it consists in mixing burnt magnesia with concentrated muriatic acid in such proportions that basic magnesium chloride is obtained. The liquid mass is then mixed with a pigment and a suitable filling substance and run into hard rubber molds, and thereby shaped into the required forms.

The burnt magnesia of commerce contains a certain quantity of magnesium carbonate, which is partly due to the incomplete kiln-burning of the natural magnesite and partly by the influence of the carbonic acid of the atmosphere on burnt magnesia. When, therefore, the burnt magnesia is mixed with concentrated muriatic acid, a reaction takes place by which the mass is highly heated and carbonic acid and chloric gas evolved. The burnt magnesia and muriatic acid are mixed in the proportion of ten thousand to twelve thousand five hundred cubic centimeters of acid to fifteen thousand grams of burnt magnesia, which proportion may be somewhat varied, according to the proportion of magnesium carbonate contained in the burnt magnesia. Care, however, has to be taken that the proportionate quantities of burnt magnesia and muriatic acid are such that a basic magnesium chloride is produced, as a surplus of muriatic acid would produce a neutral or acid magnesium chloride, which has the property of absorbing moisture from the atmosphere and become deliquescent. Plates, tiles, and other articles made from the basic magnesium chloride, however, do not absorb moisture, even if placed in boiling water. After the reaction has taken place the mass is well stirred and mixed with a suitable pigment and a mineral or other filling substance for imparting the required color and body. If the mass should become too thick, it may be made thinner by adding a small quantity of water; but this should be avoided as much as possible. The mass is then strained by passing it through a sieve and finally run into hard rubber molds, in which it sets and hardens. Practical tests have shown that hard rubber molds are best adapted for shaping the mass, as they are elastic enough to provide for the expansion and contraction of the mass while setting.

The fillings above referred to vary in material and proportions according to the character of the articles to be produced. For floor-tiles I use, for example, a filling composed of quartz sand or dolomite sand. To one part, by weight, of magnesium chloride I use from one to twelve parts of filling. For wall-tiles I use as a filling marble-dust or other powdered rock, as granite, baryte, feldspar, and limestone. In this case the proportions, by weight, are from one to three parts of filling to one part of magnesium chloride. When a filling material not acted upon by the muriatic acid is used—such, for instance, as sand—the filling may be mixed directly with the muriatic acid and burnt magnesia before the reaction of these ingredients takes place. When a small proportion of filling is used, the product more closely resembles marble, and when the proportion of filling material is large the product will somewhat resemble sandstone or other stone. The pigments employed to give color to the product are mineral pigments, and must be of such a character that they are not destroyed or discolored by the muriatic acid or magnesium chloride—such, for instance, as yellow ocher, terra di sienna, red ocher, and chrome-green. In the production of articles resembling white marble the pigment is omitted.

The analysis of the binding substance in my artificial stone may be expressed in a chemical equation, as follows:

$$6MgO + 2MgCl + 4HO$$

or $6MgO = 120 = 47.84$
$2MgCl = 94.8 = 37.79$
$4HO = 36 = 14.35$ $250.8 = 99.98$

I suppose that from the 6MgO, after mixture with the silicates or sand, some parts will go into a new combination corresponding to the natural combination in the serpentine and other minerals and similar to the equation $MO+3SiO_2+HO$.

Should it be required to produce the face of the plates, tiles, or other articles in different ornamentation and colors, the molds are engraved with the required ornaments and dry pigments in powder form placed in the molds, which pigments become intimately and permanently united with the mass. In this manner plates, tiles, and other articles may be produced in one or more colors with ornaments in relief, or with a smooth and bright surface.

Having thus described my invention, I claim as new and desire to secure by Letters Patent—

1. The process herein described of making an artificial-stone composition, which consists in mixing burnt magnesia of commerce with concentrated muriatic acid in the proportions substantially as described, so as to produce basic magnesium chloride, mixing a filling therewith, and then subjecting the mixture to a molding operation.

2. A composition of matter for artificial stone, composed of burnt magnesia in excess and concentrated muriatic acid in the proportions to form basic magnesium chloride, as described, and a filling, substantially as set forth.

In testimony whereof I have signed this specification in the presence of two subscribing witnesses.

LUDWIG PREUSSNER.

Witnesses:
EMIL CAPITAINE,
B. ROI.